Patented June 24, 1930

1,766,755

UNITED STATES PATENT OFFICE

HANS LECHER AND WALDEMAR ZIESER, OF LEVERKUSEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

VULCANIZATION ACCELERATOR

No Drawing. Application filed May 9, 1929, Serial No. 361,836, and in Germany May 18, 1928.

The present invention relates to liquid vulcanization accelerators of the probable general formula

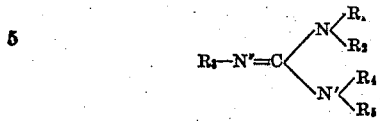

wherein $R_1$, $R_2$, $R_3$, $R_4$ and $R_5$ mean similar or dissimilar aliphatic-, aromatic-, aliphatic-aromatic-, or hydroaromatic hydrocarbon residues, whereby in the term "aliphatic-hydroaromatic residues" also chains of —$CH_2$— groups containing at least 4 carbon atoms and being linked at both ends to the same nitrogen atom, are intended to be included.

We have found that liquid pentasubstituted guanidines corresponding to the above mentioned formula are valuable vulcanization accelerators, being far superior in their accelerating action to the less substituted guanidine derivatives hitherto used for accelerating purposes. This property may partly be due to the fact, that in consequence of their state of aggregation the former can be distributed more easily and in a more homogenous form in the masses to be vulcanized, but also compared with the known liquid vulcanization accelerators the liquid pentasubstituted guanidines exert a superior acceleration action.

The pentasubstituted guanidines are obtainable, for example, according to the method described by Lecher and Graf in Berichte der Deutschen Chemischen Gesellschaft, 56, (1923) page 1326, (see also Annalen der Chemie 455, [1927] page 139). Other compounds of this group can be prepared according to the same method by replacing, for example, the methyl-mustard oil mentioned by Lecher and Graf, by phenyl-mustard oil or the like, or also by varying the other reaction components accordingly. We have prepared and tested a large number of liquid pentasubstituted guanidines, of which we list the following: pentamethylguanidine, pentaethylguanidine, pentabutylguanidine, N, N, N', N'-tetramethyl-N''-ethylguanidine:

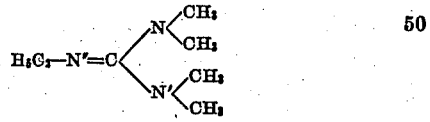

N, N, N'',- trimethyl-N', N'-diethylguanidine:

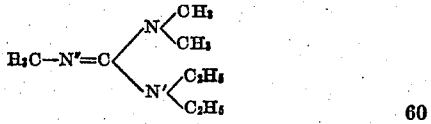

N, N, N', N'-tetrabutyl-N''-phenylguanidine:

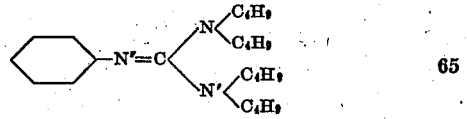

N, N-dibenzyl-N', N', N''-trimethylguanidine:

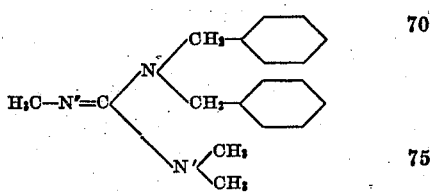

N, N, N''-trimethyl-N',-ethyl-N'-cyclohexylguanidine:

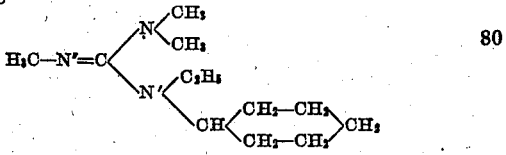

N, N, N''-trimethyl-N', N'-pentamethyleneguanidine:

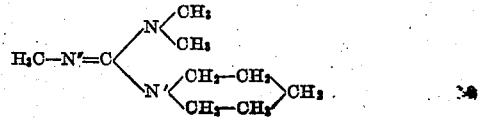

We have found that all these compounds exert excellent accelerating properties in vulcanization processes as well in the case of natural rubber as in that of artificial rubber like masses, and it may expressly be stated, not only that the compounds just mentioned are valuable vulcanization accelerators, but that this property is common to all liquid pentasubstituted guanidines corresponding to the formula mentioned in the statement of invention.

The following examples illustrate our invention, without limiting it thereto, the parts being by weight:—

*Example 1.*—A mixture of 100 parts of smoked sheets, 2 parts of sulfur, 5 parts of zinc white and 1 part of pentamethylguanidine is heated for 30 minutes to an excess pressure of 2 atm. The vulcanizate thus obtainable shows a tensile strength of 162 kg. per square centimeter at a stretch of 770%.

*Example 2.*—A mixture of 100 parts of smoked sheets, 2,5 parts of sulfur, 5 parts of zinc white and 1 part of pentabutylguanidine is heated for 8 minutes to an excess pressure of 3 atmospheres. The vulcanizate thus obtainable possesses a tensile strength of 151 kg. per square centimeter at a stretch of 694%.

*Example 3.*—A mixture is prepared from 100 parts of a polymerizate, having been obtained by polymerizing butadiene-1.3 by means of sodium metal, 50 parts of gas lamp black, 20 parts of zinc white, 4 parts of stearic acid, 3 parts of sulfur. Into this mixture one part of pentabutylguanidine is rolled in and vulcanization is performed by heating to an excess pressure of 3 atmospheres for 30 minutes. A vulcanizate is thus obtained, possessing a tensile strength of 140 kg. per square centimeter at a stretch of 885%. Contrary hereto, when working in exactly the same manner, but, while replacing the pentabutylguanidine by the same quantity of the nonliquid diphenylguanidine, a vulcanizate is obtained exerting a tensile strength of 16 kg. per square centimeter at a stretch of 1000%.

We claim:—

1. As vulcanization accelerators liquid pentasubstituted guanidines corresponding to the probable general formula

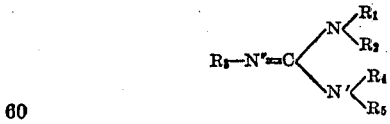

wherein $R_1$, $R_2$, $R_3$, $R_4$ and $R_5$ mean aliphatic-, aromatic-, aliphatic-aromatic-, or hydroaromatic hydrocarbon residues.

2. As vulcanization accelerators liquid pentasubstituted guanidines of the probable general formula

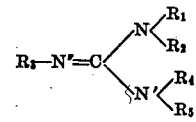

wherein $R_1$, $R_2$, $R_3$, $R_4$ and $R_5$ stand for alkyl groups.

3. As vulcanization accelerator a compound of the group comprising pentamethyl- and pentabutyl guanidine.

In testimony whereof we have hereunto set our hands.

HANS LECHER. [L. S.]
WALDEMAR ZIESER. [L. S.]